(12) United States Patent
Horng

(10) Patent No.: US 6,246,140 B1
(45) Date of Patent: Jun. 12, 2001

(54) PIVOTAL STRUCTURE FOR A MOTOR ROTOR

(75) Inventor: Alex Horng, Kaohsiung (TW)

(73) Assignee: Sunonwealth Electric Machine Industry, Kaohsiung (TW)

( * ) Notice: Subject to any disclaimer, the term of this patent is extended or adjusted under 35 U.S.C. 154(b) by 0 days.

(21) Appl. No.: 09/521,840

(22) Filed: Mar. 9, 2000

(51) Int. Cl.[7] ...................................... H02K 5/00
(52) U.S. Cl. ................... 310/91; 310/89; 310/90; 310/40 MM; 417/423.12
(58) Field of Search ............ 310/91, 89, 40 MM, 310/90; 417/423.7, 423.12

(56) References Cited

U.S. PATENT DOCUMENTS

| | | | |
|---|---|---|---|
| 4,554,491 | * 11/1985 | Plunkett | 310/186 |
| 4,959,571 | * 9/1990 | Yasumoto et al. | 310/67 R |
| 5,028,216 | * 7/1991 | Harmsen et al. | 417/354 |
| 5,492,458 | 2/1996 | Horng . | |

* cited by examiner

Primary Examiner—Elvin Enad
Assistant Examiner—Thanh Lam
(74) Attorney, Agent, or Firm—Bacon & Thomas, PLLC

(57) ABSTRACT

A pivotal structure for a motor rotor includes a housing with a stub thereon for engaging with a metal axle tube. The stub includes an inner ledge on which the metal axle tube rests. An expander has a stem inserted into an end of the metal axle tube. The stem has a diameter greater than or equal to an inner diameter of the metal axle tube, such that the metal axle tube is expanded in the radial direction and thus firmly secured with and positioned at the inner periphery of the stub. The metal axle tube includes a bearing mounted therein for pivotally holding a central shaft of a rotor. An outer periphery of the metal axle tube is engaged with a stator bobbin.

11 Claims, 4 Drawing Sheets

PIVOTAL STRUCTURE FOR A MOTOR ROTOR

BACKGROUND OF THE INVENTION

1. Field of the Invention

The present invention relates to a pivotal structure for a motor rotor of, e.g., a miniature heat-dissipating fan that includes a metal axle tube having a bearing mounted therein. An outer periphery of the metal axle tube is engaged with a stator bobbin. The metal axle tube is mounted in place very reliably, thereby allowing stable rotation of the rotor.

2. Description of the Related Art

U.S. Pat. No. 5,492,458 to Alex Horng issued on Feb. 20, 1996 discloses an electric fan includes a housing having a stub 11 formed in the center. A metal axle tube 4 has one end force-mounted in the stub 11 and an annular flange 43 formed in the other end. Two pole plates 30 and 32 are force-fitted on the axle tube 4, and a stator 3 is disposed between the pole plates 30 and 32. The metal axle tube 4 has a diameter greater than inner diameter of central holes 34 and 35 of the pole plates 30 and 32 and inner diameter of a central hole 21 in a circuit board 2. The diameter of the metal axle tube 4 is slightly smaller than that of a central hole 33 of the stator 3. Nevertheless, it is found that the stub 11 breaks if force mounting between the metal axle tube 4 and the stub 11 is too tight. On the contrary, the metal axle tube 4 will loosen in an undesired manner if the force mounting between the metal axle tube 4 and the stub 11 is too loose.

SUMMARY OF THE INVENTION

It is a primary object of the present invention to provide a pivotal structure for a rotor of a miniature motor, wherein the metal axle tube and the stub on the housing have an optimized engagement therebetween such that the metal axle tube may be firmly secured to the stub. The metal tube receives a bearing therein for pivotally holding the central shaft of the rotor.

It is a secondary object of the present invention to provide a pivotal structure for a rotor of a miniature motor, wherein the central shaft of the rotor may rotate in a stable manner.

In accordance with the present invention, the stub of the housing has a through-hole and includes a ledge formed in a lower portion of the through-hole for supporting a lower end of the metal axle tube that is force-fitted into the stub from top. An expander is inserted into a lower end of the stub and has a stem extended through the ledge and into the lower end of the metal axle tube. Thus, the metal axle tube is expanded radially outward by the stem of the expander and thus securely engaged to the inner periphery defining the through-hole of the stub. An end surface of the stem may support a lower end of the central shaft of the rotor, thereby allowing more stable rotation of the rotor.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

The present invention will be described below with reference to the accompanying drawings.

Figure 1:
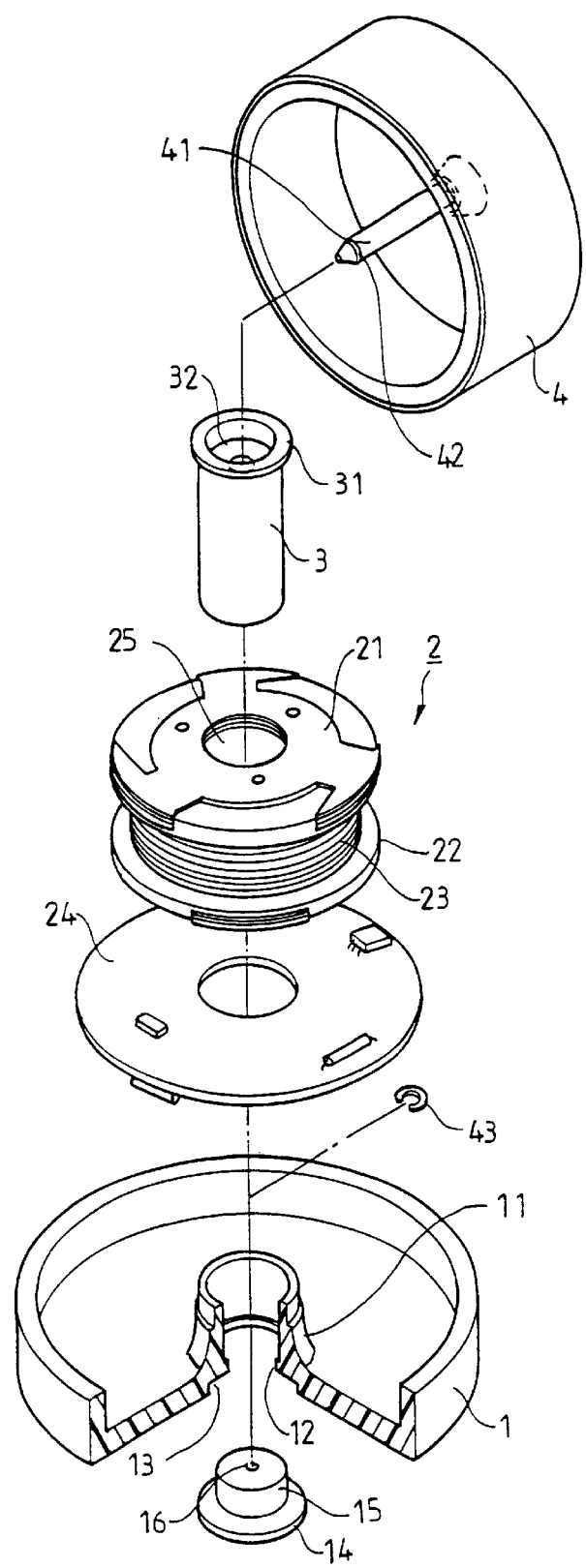
FIG. 1 is an exploded perspective view of a motor with a first embodiment of a pivotal structure in accordance with the present invention.
Figure 2:
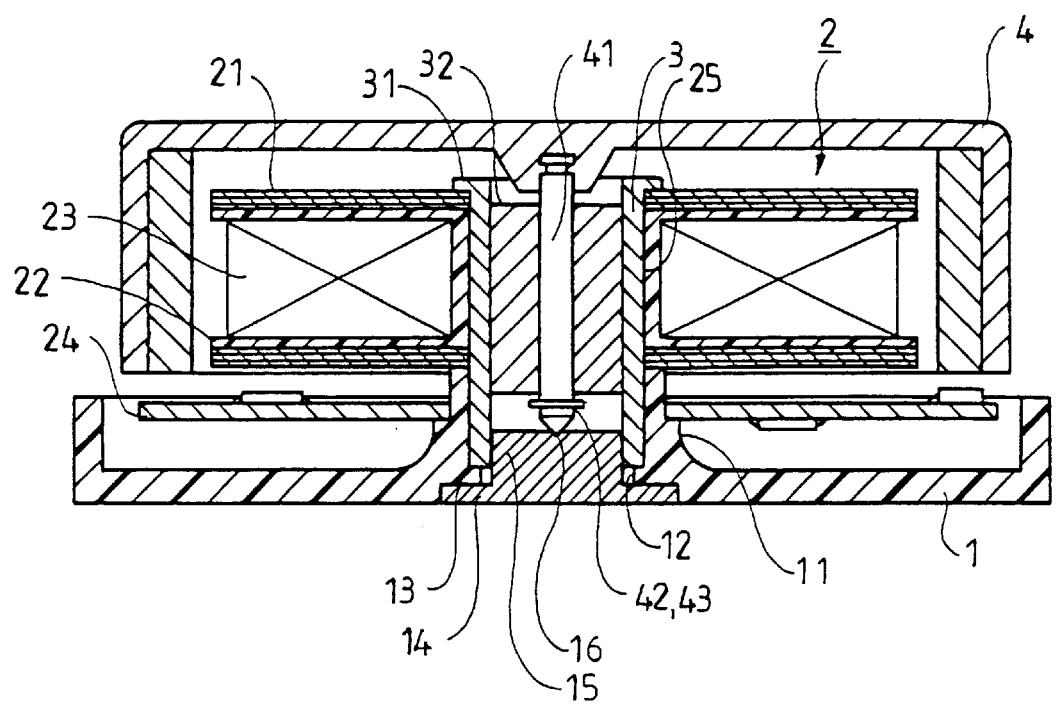
FIG. 2 is a sectional view of the motor in FIG. 1.

Referring to FIGS. 1 and 2, a motor with a first embodiment of a pivotal structure in accordance with the present invention generally includes a housing 1, a stator bobbin 2, a metal axle tube 3, and a rotor 4.

The housing 1 may be a frame of a heat-dissipating fan or any housing suitable for engaging with a stator bobbin and for pivotally supporting a rotor. The housing 1 includes a stub 11 of an appropriate height. The stub 11 includes a through-hole (not labeled) having a ledge 12 (preferably annular) formed on a lower portion of an inner periphery thereof. An end (the upper one in FIGS. 1 and 2) of the stub 11 is provided for engaging with the axle tube 3. An inner diameter of the upper end of the stub 11 is equal to or slightly smaller than an outer diameter of the metal axle tube 3. The lower end of the metal axle tube 3 that is force-fitted into the stub 11 rests on the ledge 12 and thus has a reliable positioning effect. An enlarged head (not labeled) of an expander 14 abuts against the other end (the lower one) of the stub 11 to thereby limit insertion depth of the expander 14. A bottom side of the housing 1 includes a countersink 13 that surrounds a lower end of the stub 11, the countersink 13 having a diameter greater than that of the through-hole of the stub 11. The countersink 13 accommodates the enlarged head of the expander 14 such that the enlarged head of the expander 14 does not extend beyond the bottom side of the housing 1. The expander 14 further includes a stem 15 projected from a side of the enlarged head and having a smaller diameter. The stem 15 is extended through the ledge 12 into the lower end of the metal axle tube 3. Diameter of the stem 15 is slightly greater than or equal to an inner diameter of the metal axle tube 3. Thus, the stem 15 may be force-fitted into the metal axle tube 3 and thus expand the metal tube 3 in a radial direction to thereby secure the metal axle tube 3 to the inner periphery of the stub 11.

The stator bobbin 2 includes an upper pole plate 21, a lower pole plate 22, a coil 23 sandwiched between the pole plates 21 and 22, and a circuit board 24. The metal axle tube 3 is extended through central holes 25 of the pole plates 21 and 22. Diameter of the central holes 25 of the pole plates 21 and 22 is equal to or slightly smaller than the outer diameter of the metal axle tube 3. The circuit board 24 is secured to the metal axle tube 3 or the outer periphery of the stub 11 of the housing 1 (FIG. 2).

The metal axle tube 3 includes a flange 31 formed on the upper end thereof to prevent disengagement of the stator bobbin 2. A bearing 32 is mounted in the axle tube 3 in a tight fitting manner. The outer diameter of the metal axle tube 3 is equal to or slightly greater than the diameter of the central holes 25 of the upper and lower pole plates 21 and 22 and the inner diameter of the stub 11. The metal axle tube 3 is force-mounted into the stub 11 and is positioned by means of resting on the ledge 12.

The rotor 4 may include blades (not labeled) to form a conventional fan impeller. The rotor 4 includes a central shaft 41 pivotally held by the bearing 32 in the axle tube 3. The central shaft 41 includes an annular groove 42 so as to be retained by a retainer element 43 (e.g., a C-clip) to lock the rotor 4 in place. A distal lower end of the central shaft 41 rests on an end surface of the stem 15 of the expander 14. The end face of the stem 15 may include a depression 16 for pivotally supporting the lower end of the central shaft 41. Thus, the rotor 4 may rotate in a more stable manner.

In assembly, as illustrated in FIG. 2, the axle tube 3 with the stator bobbin 2 mounted therearound is tightly mounted on (by force fitting) the stub 11 of the housing 1 and rests on the ledge 12. The central shaft 41 of the rotor 4 is pivotally held by the bearing 32 in the axle tube 3 and retained in place by the retainer element 43. Next, the expander 14 is mounted to the bottom side of the housing 1 wherein the stem 15 of a smaller diameter is extended through the ledge 12 and force-fitted into the lower end of the metal axle tube 3. Thus, the metal axle tube 3 expands outward in a radial direction and is thus tightly secured to the inner periphery of the stub 11 without the risk of disengagement. In addition, the lower end of the central shaft 41 is pivotally supported by the end surface of the stem 15 of the expander 14, thereby assuring stabler rotation of the rotor 4. Further, a space defined in the metal axle tube 3 between the bearing 32 and the expander 14 may be used for storage of lubrication oil, thereby providing better lubricating effect, which is more significant if the bearing 32 is an oil-pregnant bearing or self-lubrication bearing.

Figure 3:
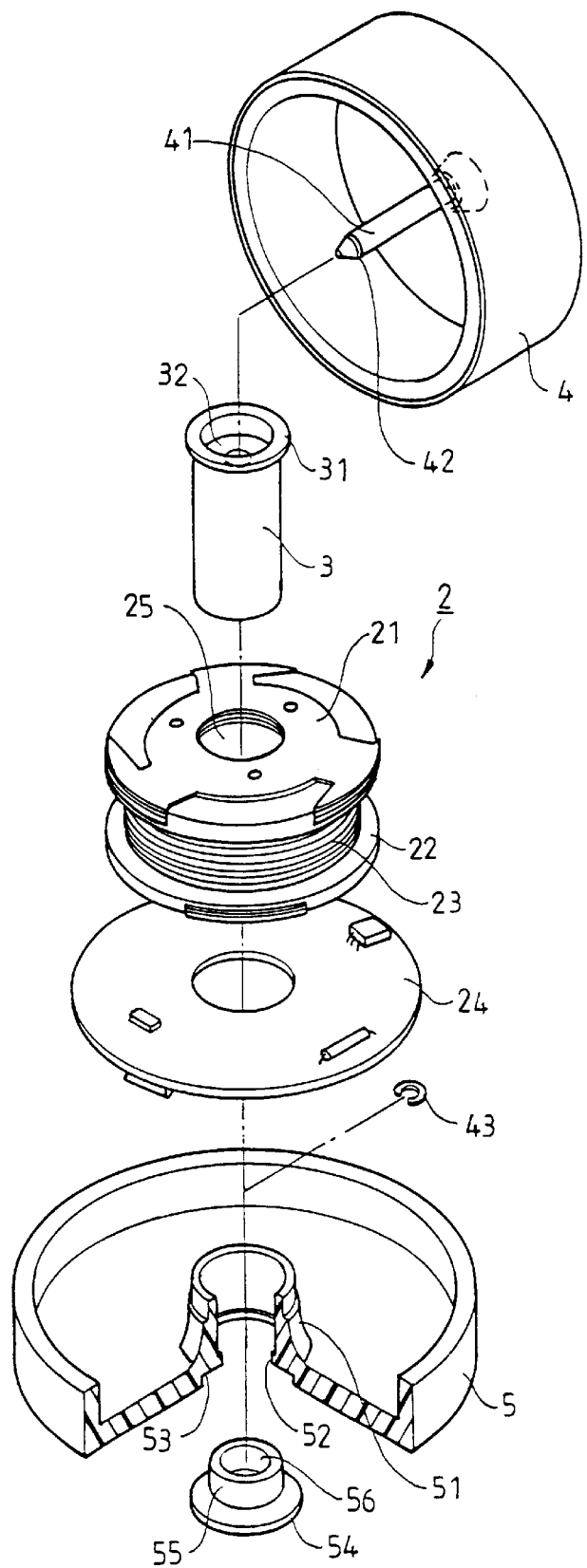
FIG. 3 is an exploded perspective view of a motor with a second embodiment of the pivotal structure in accordance with the present invention.
Figure 4:
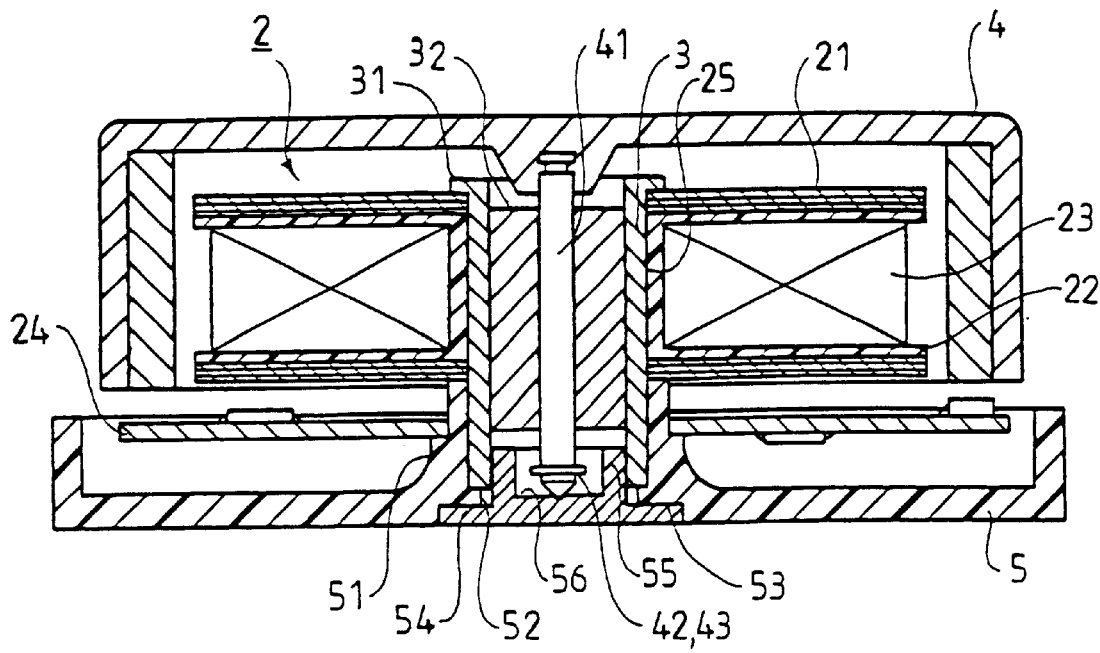
FIG. 4 is a sectional view of the motor in FIG. 3.

FIGS. 3 and 4 illustrate a second embodiment of the pivotal structure in accordance with the present invention. In this embodiment, the housing 5 includes a stub 51 for engaging with the metal axle tube 3 and includes a ledge 52 to avoid excessive insertion of the metal axle tube 3. After the metal axle tube 3 is engaged into the stub 51, an expander 54 is mounted to a bottom side of the housing 5. The bottom side of the housing 5 includes a countersink 53 having a diameter greater than the through-hole (not labeled) of the stub 51 for receiving the enlarged head (not labeled) of the expander 54 such that the enlarged head of the expander does not protrude beyond the bottom side of the housing 5. The expander 54 further includes a stem 55 projected from a side of the enlarged head and having a smaller diameter. Diameter of the stem 55 is slightly greater than or equal to an inner diameter of the metal axle tube 3. Thus, the stem 55 may be force-fitted into the metal axle tube 3 and thus expand the metal tube 3 in a radial direction to thereby tightly secure the metal axle tube 3 to the inner periphery of the stub 51. An end surface of the stem 55 include a recess 56, and a bottom wall defining the recess 56 has a depression (not labeled) for providing a rotational support for the lower end of the central shaft 41. Thus, the metal axle tube 3 is firmly secured in place for pivotally supporting the rotor 4 in a stable manner.

Figure 5:
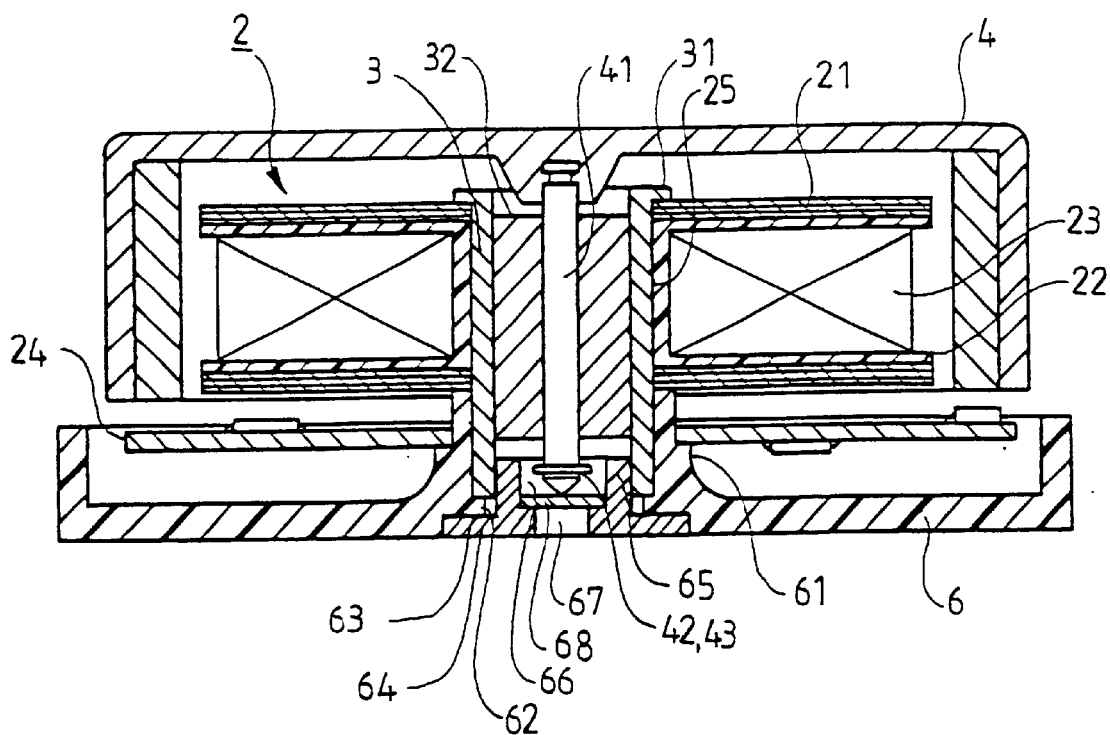
FIG. 5 is a sectional view similar to FIG. 4, illustrating a motor with a third embodiment of the pivotal structure in accordance with the present invention.

FIG. 5 illustrates a modified embodiment of the pivotal structure in accordance with the present invention. In this embodiment, the expander 64 mounted in the housing 6 includes a stem 65 projected from a side of the enlarged head and having a smaller diameter. The stem 65 is extended through the ledge 62 in the stub 61 and engaged with the inner periphery of the metal axle tube 3. The stem 65 is force-fitted into the metal axle tube 3 and thus expand the metal tube 3 in a radial direction to thereby secure the metal axle tube 3 to the inner periphery of the stub 61. An end face of the stem 65 includes a recess 66, and a bottom wall defining the recess 66 has a through-hole 67 covered by a pad 68. The pad 68 is made of abrasion-resistant material for pivotally supporting a lower end of the central shaft 41. Thus, the pad 68 may be deformed properly to provide smoother and more stable rotation for the central shaft 41.

According to the above description, the outer diameter of the metal axle tube may equal to or slightly greater than the inner diameter of the stub on the housing, and the stub includes a ledge therein for supporting the metal axle tube to avoid excessive insertion of the metal axle tube during assembly. Meanwhile, when the stem of the expander is extended through the ledge and then inserted into the metal axle tube, the metal axle tube is expanded outward in a radial direction such that the metal axle tube is tightly and firmly engaged onto the inner periphery of the stub. Accordingly, disengagement of the metal axle tube of the motor rotor is avoided. In addition, the end surface (with a depression or recess or having a pad covering the recess that has a through-hole) provide a support for the lower end of the central shaft such that the rotor may rotate in a more stable manner.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A pivotal structure for a rotor of a motor, comprising:
   a housing including a stub having a through-hole with a ledge formed on an inner periphery defining the through-hole;
   a stator bobbin including pole plates and a coil and a central hole;
   a metal axle tube having a bearing mounted to an inner periphery thereof, the metal axle tube having an outer periphery engaged with the stator bobbin and the stub, the metal axle tube having an outer diameter equal to or slightly greater than an inner diameter of the through-hole of the stub, the metal axle tube being engaged to the inner periphery of the through-hole of the stub with an end of the metal axle tube resting on the ledge;
   a rotor including a central shaft pivotally held by the bearing in the axle tube; and
   an expander including an enlarged head and a stem projected from a side of the enlarged head, the stem having a diameter greater than or equal to an inner diameter of the metal axle tube, the stem being extended through the ledge and force-fitted into the inner periphery of the metal axle tube for expanding the metal axle tube in a radial direction, thereby tightly secure the metal axle tube with the inner periphery of the through-hole of the stub.

2. The pivotal structure for a rotor of a motor as claimed in claim 1, wherein the ledge has a first end on which the end of the metal axle tube rests and a second end to which the enlarged head of the expander abuts, thereby being securely sandwiched in place by the metal axle tube and the enlarged head of the expander.

3. The pivotal structure for a rotor of a motor as claimed in claim 1, wherein the housing includes a countersink defined in a bottom side thereof and surrounding the stub for receiving the enlarged head of the expander such that the enlarged head of the expander does not protrude beyond the bottom side of the housing.

4. The pivotal structure for a rotor of a motor as claimed in claim 1, wherein the stem of the expander inserted into the metal axle tube includes an end surface with a depression for pivotally supporting the central shaft.

5. The pivotal structure for a rotor of a motor as claimed in claim 1, wherein the stem of the expander inserted into the metal axle tube includes an end surface with a recess.

6. The pivotal structure for a rotor of a motor as claimed in claim 5, wherein a bottom wall defining the recess has a depression for pivotally supporting the central shaft.

7. The pivotal structure for a rotor of a motor as claimed in claim 5, wherein a bottom wall defining the recess has a through-hole that is covered by a pad made of abrasion-resistant material, the pad providing a rotational support for the central shaft.

8. The pivotal structure for a rotor of a motor as claimed in claim 1, wherein the stator bobbin further comprises a circuit board with a central hole of a diameter equal to or slightly smaller than the outer diameter of the metal axle tube, and wherein the outer periphery of the metal axle tube is mounted in the central hole of the circuit board.

9. The pivotal structure for a rotor of a motor as claimed in claim 1, wherein the stator bobbin further comprises a circuit board with a central hole of a diameter equal to or slightly smaller than an outer diameter of the stub, and wherein the outer periphery of the stub is mounted in the central hole of the circuit board.

10. The pivotal structure for a rotor of a motor as claimed in claim 1, wherein the bearing in the metal axle tube and the stem of the expander have a space therebetween for storage of lubrication oil.

11. The pivotal structure for a rotor of a motor as claimed in claim 1, wherein the rotor is a fan impeller with blades.

* * * * *